US009055056B2

(12) United States Patent
Matthews et al.

(10) Patent No.: US 9,055,056 B2
(45) Date of Patent: Jun. 9, 2015

(54) MANAGING DIGITAL CONTENT ENTITLEMENTS

(71) Applicant: Red Hat, Inc., Raleigh, NC (US)

(72) Inventors: John Matthews, Wake Forest, NC (US); Wes Hayutin, Raleigh, NC (US); Christopher Duryee, Durham, NC (US); James Slagle, Raleigh, NC (US); Chris Morgan, Raleigh, NC (US); Todd Sanders, Clayton, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/966,485

(22) Filed: Aug. 14, 2013

(65) Prior Publication Data

US 2015/0052585 A1  Feb. 19, 2015

(51) Int. Cl.
*H04L 29/06* (2006.01)
*G06F 21/31* (2013.01)
*G06F 21/10* (2013.01)

(52) U.S. Cl.
CPC ............ *H04L 63/0823* (2013.01); *G06F 21/31* (2013.01); *G06F 2221/0771* (2013.01); *G06F 21/10* (2013.01)

(58) Field of Classification Search
CPC . G06F 21/10; G06F 21/31; G06F 2221/0771; H04L 63/0823
USPC ....................................... 726/4, 28
See application file for complete search history.

(56) References Cited

U.S. PATENT DOCUMENTS

| 6,058,484 | A  | * | 5/2000  | Chapman et al. ............... 726/10 |
| 7,627,896 | B2 |   | 12/2009 | Herrmann |
| 8,181,262 | B2 |   | 5/2012  | Cooper et al. |
| 2002/0184493 | A1 |   | 12/2002 | Rees |
| 2005/0114896 | A1 | * | 5/2005  | Hug et al. ....................... 725/88 |
| 2007/0005989 | A1 | * | 1/2007  | Conrado et al. ............. 713/189 |
| 2007/0186111 | A1 |   | 8/2007  | Durand et al. |

(Continued)

FOREIGN PATENT DOCUMENTS

WO   2010107298   9/2010

OTHER PUBLICATIONS

Vipul Goyal, "Fast Digital Certificate Revocation", IFIP International Federation for Information Processing, http://link.springer.com/chapter/10.1007/1-4020-8143-X_32, 2004.

(Continued)

*Primary Examiner* — Michael Pyzocha
(74) *Attorney, Agent, or Firm* — Lowenstein Sandler LLP

(57) ABSTRACT

Systems and methods for managing digital content entitlements in distributed computer systems. An example method may comprise: receiving, by a processor, a request comprising an identity certificate and a digital content identifier; validating an entitlement of a requestor identified by the identity certificate to consume, over an entitlement period of time, the digital content identified by the digital content identifier; determining that a pre-defined authorization period of time does not exceed the entitlement period of time; and transmitting, to the requestor, a response comprising at least one of: a status code and a content certificate authorizing to consume the digital content for the pre-defined authorization period of time.

20 Claims, 4 Drawing Sheets

(56) References Cited

U.S. PATENT DOCUMENTS

| | | | |
|---|---|---|---|
| 2008/0195546 A1* | 8/2008 | Lilley | 705/59 |
| 2009/0144540 A1 | 6/2009 | Davis et al. | |
| 2010/0250437 A1 | 9/2010 | Goeller et al. | |
| 2013/0036301 A1* | 2/2013 | Pelton et al. | 713/155 |
| 2013/0060919 A1* | 3/2013 | Khandekar et al. | 709/220 |
| 2013/0132719 A1* | 5/2013 | Kobayashi et al. | 713/158 |

OTHER PUBLICATIONS

Shamimabi Paurobally, "SLA Negotiation for VO Formation", Grids and Service-Oriented Architectures for Service Level Agreements, http://link.springer.com/chapter/10.1007/978-1-4419-7320-7_12, 2010.

Red Hat ISV Program Guide, http://in.redhat.com/legal/APJ_ISV_Program_Guide-v3-2.pdf.

* cited by examiner

MANAGING DIGITAL CONTENT ENTITLEMENTS

TECHNICAL FIELD

The present disclosure is generally related to distributed computer systems, and is more specifically related to systems and methods for managing entitlements to consume digital content in distributed computer systems.

BACKGROUND

In distributed computer systems, such as cloud systems, service providers may supply a wide range of computing resources, including physical servers and/or virtual machines, raw and file-based storage, firewalls, load balancers, IP addresses, virtual local area networks (VLANs), wide area network (WAN) connectivity, and/or software products. The resources may be provisioned on-demand from large resource pools, with the ability to scale the services up and down in real time.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
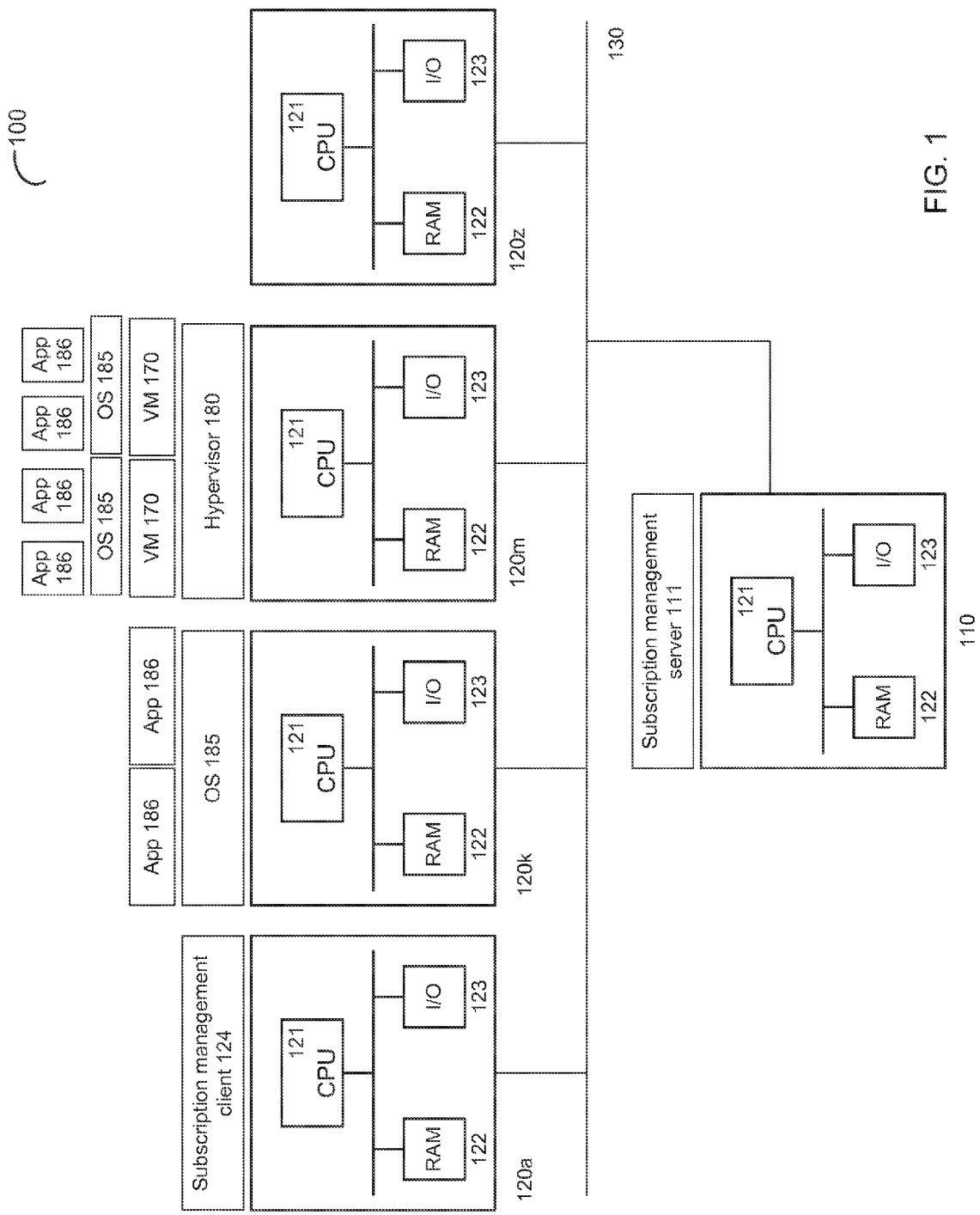
FIG. 1 depicts a high-level component diagram of one illustrative embodiment of a distributed computer system 100 in accordance with one or more aspects of the present disclosure.

Described herein are methods and systems for managing entitlements to consume digital content in distributed computer systems. "Computer system" herein shall refer to a system comprising one or more processors, one or more memory devices, and one or more input/output (I/O) interfaces. In certain implementations, a computer system may be provisioned by a cloud service provider and may comprise physical servers and/or virtual machines, raw and file-based storage, firewalls, load balancers, IP addresses, virtual local area networks (VLANs), wide area network (WAN) connectivity, and/or software products. In an illustrative example, a computer system may comprise one or more virtual machines executed on one or more physical servers interconnected by one or more networks, as schematically depicted in FIG. 1.

In accordance with one or more aspects of the present disclosure, a computer system may consume digital content (e.g., software products) under a managed subscription model. A subscription establishes relationships between one or more digital content items (e.g., software products, executable and/or non-executable files) and one or more computer systems which consume the digital content (e.g., by executing the software products), by specifying entitlements of the computer systems to consume the digital content. An entitlement may specify the number of servers and/or processors licensed to consume the specified digital content and the entitlement period of time (e.g., a time period over which the digital content is licensed to be consumed under the subscription, or the license expiration date). An entitlement may further specify other information related to the digital content, including, e.g., architectures that the digital content is available for, support levels for the digital content, content repositories on which the digital content may be accessed, etc.

A remote or on-premises subscription management server may manage subscriptions for one or more computer systems operated by an organizational entity (e.g., a customer account of a cloud-based system customer). The digital content may reside on one or more remote or on-premise content delivery servers. Either or both of the subscription management server and the content delivery server may be operated by the organizational entity itself or by a third party subscription service provider.

In certain implementations, digital content managed in accordance with one or more aspects of this disclosure may comprise executable files, binary data, documents, media content files, and/or binary data streams. In an illustrative example, digital content may comprise one or more software products. The latter term refers to one or more software packages, including one or more primary software packages and optional associated packages containing software dependencies (e.g., drivers, middleware, etc.).

A subscription management server may maintain an inventory of managed computer systems and an inventory of subscriptions available to the managed computer systems. When a new managed computer system is registered with the subscription management server, or a new subscription is added to the inventory of subscription, the subscription management server may issue a content certificate to a managed computer system. The content certificate may serve as a proof of entitlement of the managed computer system to consume the digital content under the subscription.

In certain implementations, a content certificate issued to a managed computer system may have an expiration timestamp corresponding to the expiration of the underlying subscription. Such an approach, while working well for physical servers which may have a lifetime span of several years, may turn out to be less suitable for virtual machines, which might have a much shorter lifetime, e.g., ranging from several minutes to several hours.

The present disclosure addresses this deficiency by employing short-lived content certificates. A managed computer system consuming the digital content under a managed subscription model may, in accordance with one or more aspects of the present disclosure, execute a subscription management client daemon which may periodically transmit content certificate requests to a subscription management server. "Daemon" herein shall refer to a computer program which is executed as a background process. In certain implementations, the parent process of the subscription management client daemon may be a process directly spawned by the operating system kernel (such as the system initialization process, e.g., init process). The subscription management client daemon may using a logfile, the system console, or the system null device (such as /dev/null) as the standard input, standard output and/or standard error device.

A content certificate request may comprise an identity certificate and a content identifier. The identity certificate may be issued to one or more managed computer systems by a trusted certificate authority (CA). The identity certificate may bind, by a digital signature, a public key to an identifier of a managed computer system consuming the digital content under a managed subscription. In an illustrative example, a managed computer system may be provided by a computer system comprising one or more virtual machines executed by one or more physical servers.

Responsive to receiving a content certificate request, the subscription management server may validate the identity certificate and the entitlement of the requestor to consume the requested digital content. Should both the identity certificate and the entitlement be found valid, the subscription management server may issue a short-lived content certificate authorizing the requestor to consume the digital content for a pre-defined period of time (e.g., one hour), which is less than the remaining entitlement period. Upon or before expiration of the content certificate, the managed computer system may re-transmit the content certificate request to receive a new short-lived content certificate for the next pre-defined period of time.

Thus, a subscription management server operating in accordance with one or more aspects of the present disclosure may adapt the managed subscription model to virtual machines by employing short-lived content certificates, as described in more details herein below. Various aspects of the above referenced methods and systems are described in details herein below by way of examples, rather than by way of limitation.

FIG. 1 depicts a high-level component diagram of an illustrative example of a subscription management system 100 in accordance with one or more aspects of the present disclosure. Subscription management system 100 may include a subscription management server 110 and a plurality of managed computer systems 120a-120z interconnected via one or more networks 130.

Each of computer systems 110 and 120a-120z may comprise one or more processors 121 communicatively coupled to memory devices 122 and input/output (I/O) devices 123. "Processor" or "CPU" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). "Memory device" herein refers to a volatile or non-volatile memory device, such as RAM, ROM, EEPROM, or any other device capable of storing data. "I/O device" herein refers to a device capable of providing an interface between one or more processor pins and an external device capable of inputting and/or outputting binary data.

In an illustrative example, a managed computer system, such as computer system 120k, may execute an operating system 185 and one or more applications 186. In another illustrative example, a managed computer system, such as computer system 120m, may run one or more virtual machines 170, by executing a software layer 180, often referred to as "hypervisor," above the hardware and below the virtual machines. In certain implementations, hypervisor 180 may be a component of operating system 185 executed by host computer system 120m. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170 as virtual devices, including virtual processors, virtual memory, and virtual I/O devices. Each virtual device may map to a physical device of the host machine (e.g., a network interface device, a CD-ROM drive, etc.). Virtual machine 170 may execute a guest operating system 185. One or more applications 186 may be running on a virtual machine 170 under guest operating system 185. In certain implementations, computing resources and digital content including virtual machines 170, operating systems 185 and/or applications 186 may be provisioned and consumed under a managed subscription model.

In an illustrative example, managed computer systems 120a-120z may be provisioned by a cloud service provider operating a subscription management server 110. The latter may execute a subscription management server process 111 to maintain an inventory of subscriptions available to managed computer systems 120a-120z, and may issue short-lived content certificates responsive to receiving content certificate requests from managed computer systems 120a-120z. Managed computer systems 120a-120z may be operated by one or more customers of the cloud service provided by the cloud service provider. A cloud service customer may be represented, e.g., by an organizational entity associated, by the cloud service provider, with a customer account.

Figure 2:
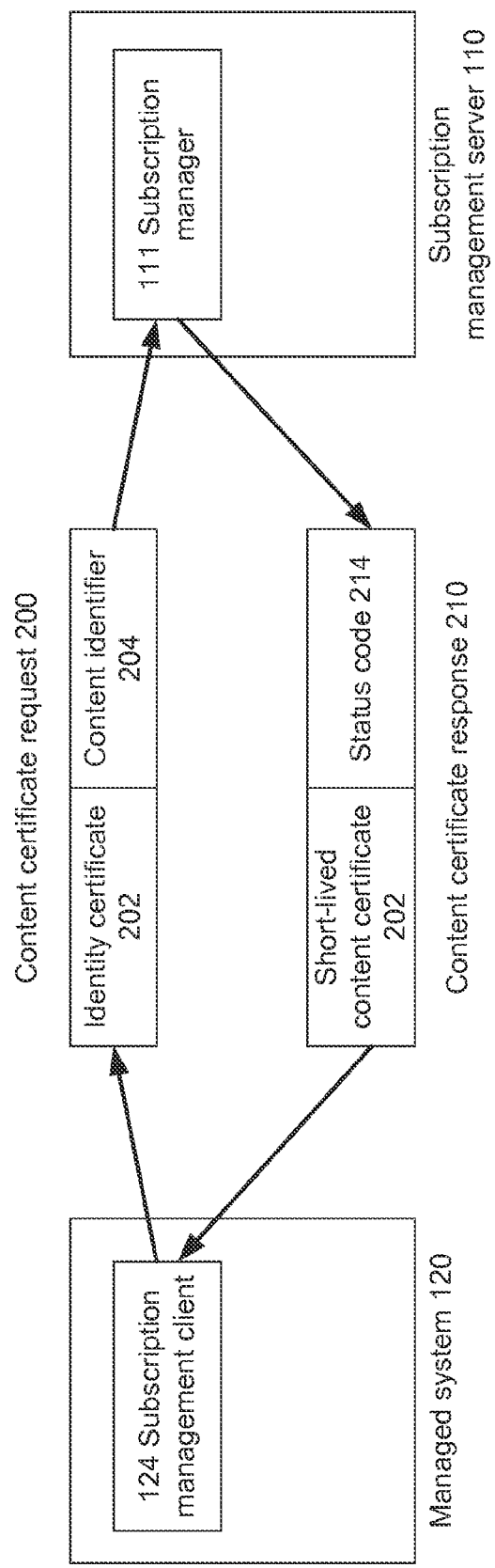
FIG. 2 schematically depicts an illustrative example of a request-response sequence between a subscription management client and a subscription management server, in accordance with one or more aspects of the present disclosure.

In an illustrative example, managed computer system 120a may execute a subscription management client daemon 124. As schematically illustrated by FIG. 2, subscription management client daemon 124 executed by managed computer system 120 may transmit to subscription management server 111 a content certificate request 200 comprising an identity certificate 202 and a content identifier 204. In certain implementations, the requests and responses flowing between the subscription management server and a managed computer system may be compliant to a Representational State Transfer (REST) protocol, such as HTTP or SOAP. In an illustrative example, a content certificate request may be represented by a PUT request transmitted over HTTPS:

PUT Request-URI Content-ID wherein Request-URI string may comprise a requestor identifier (such as an LDAP-compliant distinguished name (DN)), and Product-ID string may comprise one or more content identifiers for the requested content items (e.g., software product identifiers).

Alternatively, other HTTP methods or SOAP verbs may be used to build a content certificate request.

Digital content identified by a digital content request may comprise executable files, binary data, documents, media content files, and/or binary data streams. In an illustrative example, digital content may comprise a software product. The latter term may refer to one or more software packages, including one or more primary software packages and optional associated packages containing software dependencies (e.g., drivers, middleware, etc.).

Identity certificates may be issued to managed computer systems 120 by subscription management server 111 or by a trusted third-party CA. An identity certificate may bind, by a digital signature, a public key to an identifier of the requestor. In certain implementations, the identity certificate may comprise the following fields: the serial number of the certificate, the issuer identifier, validity dates, the subject identifier, the subject's public key, and a digital signature. In an illustrative example, the identity certificate may conform to X.509 standard.

Responsive to receiving a content certificate request, the subscription management server may validate the identity certificate and the entitlement of the requestor to consume the requested digital content.

Should the identity certificate validation fail (e.g., the certificate was not issued by a trusted CA), the subscription management server may transmit a response comprising a status code (e.g., HTTP 403) indicating that the identity certificate is invalid, and hence a content certificate could not be issued.

Should the identity certificate validation succeed, but the subscription management server has no information on the requestor identified by the certificate, the subscription management server may transmit a response comprising a status code (e.g., HTTP 404) indicating that the identity certificate is valid, but the requestor is unknown, and hence a content certificate could not be issued.

Should the identity certificate validation succeed, and the requestor identified by the certificate be known to the subscription management server, but unauthorized to consume the requested content, the subscription management server may transmit a response comprising a status code (e.g., HTTP 402) indicating that the requestor is unauthorized to consume the requested content, and hence a content certificate could not be issued.

Should both the identity certificate and the entitlement be found valid, the subscription management server may issue a short-lived content certificate authorizing the requestor to consume the digital content for a pre-defined authorization period of time (e.g., one hour), which is less than the remaining entitlement period.

In an illustrative example, the duration of the pre-defined authorization period covered by a short-lived content certificate may be a system-wide parameter of the subscription management server. Alternatively, the duration of the pre-defined authorization period may specified, e.g., on a per customer account basis, or on a per managed computer system basis. In certain implementations, the duration of the pre-defined authorization period may be determined based on the identity specified by the identity certificate received as a part of the content certificate request. In certain implementations, the duration of the pre-defined authorization period may be chosen to be less than or equal to the expected lifetime of the requesting managed computer system. The expected lifetime of the requesting managed computer system may be determined, e.g., based on the entitlement contract covering the managed computer system. In an illustrative example, the duration of the pre-defined authorization period may range from several minutes to several hours.

Upon issuing the short-lived content certificate, the subscription management server may transmit a response 210 that, as schematically illustrated by FIG. 2, may comprise the short-lived content certificate 212 and a status code 214 (e.g., HTTP 200) indicating that the request was successfully processed.

The subscription managed client executed by a managed computer system may analyze the status code of the response. If the status code indicates a successful completion of the content certificate request, the subscription managed client may save the received content certificate in a file system. Upon or before expiration of the content certificate, the managed computer system may re-transmit the content certificate request to receive a new short-lived content certificate for the next pre-defined period of time.

If the status code indicates a recoverable error condition (e.g., the request is being processed by the subscription management server), the managed computer system may re-transmit the request after expiration of a pre-defined timeout.

If the status code indicates an error which could not be resolved by the subscription management server (e.g., invalid or unknown identity certificate, or expired or non-existent subscription for the requested digital content), the managed computer system may log an error message comprising the status code, display an error message comprising the status code, and/or transmit an error message comprising the status code to an external computer system for logging, displaying, and/or performing other processing.

Figure 3:
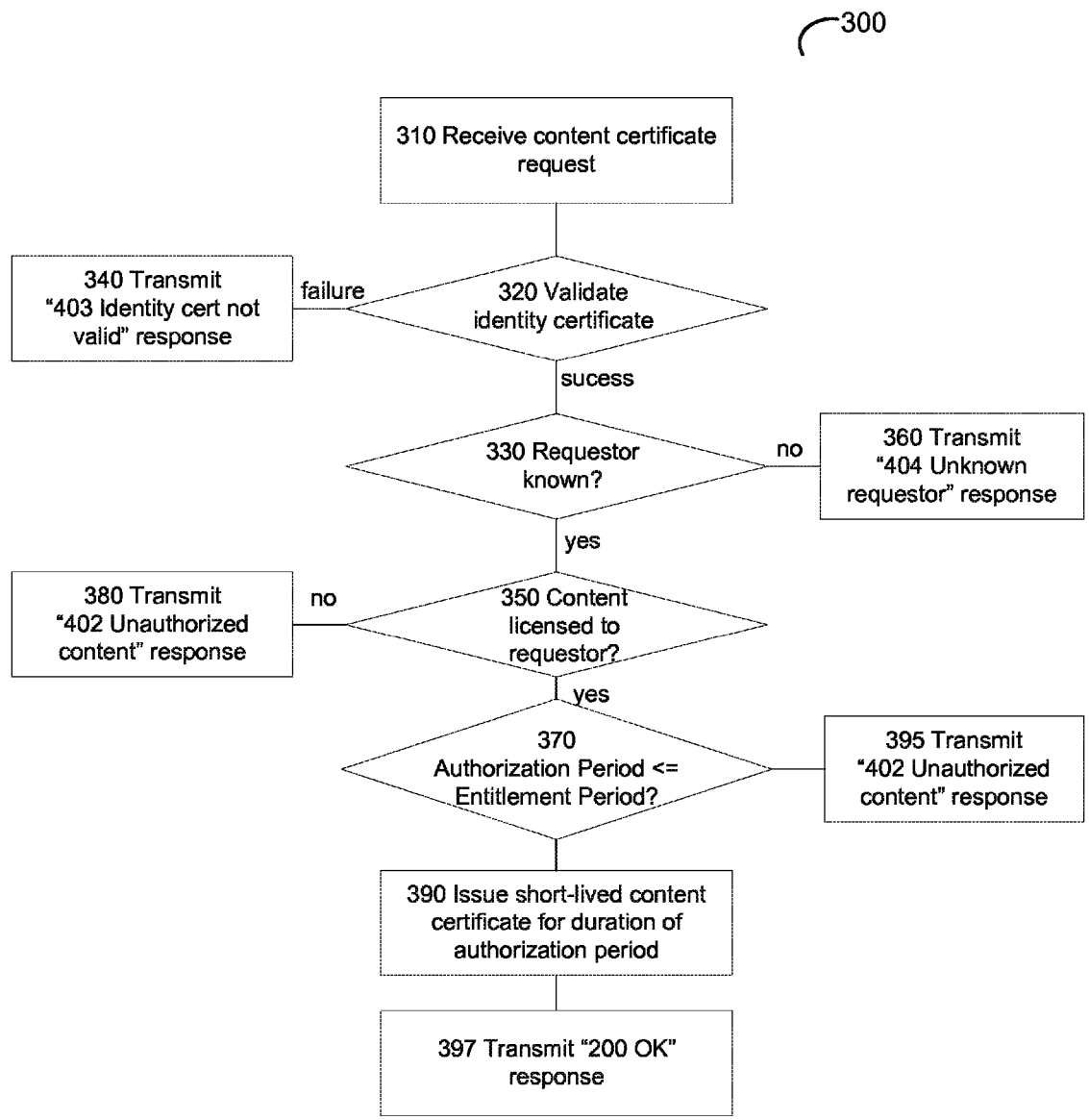
FIG. 3 depicts a flow diagram of a method for managing entitlements to consume digital content in distributed computer systems, in accordance with one or more aspects of the present disclosure.

FIG. 3 depicts a flow diagram of one embodiment of a method 300 for managing entitlements to consume digital content in distributed computer systems. Method 300 may be performed by a computer system that may comprise hardware (e.g., circuitry, dedicated logic, and/or programmable logic), software (e.g., instructions executable on a computer system to perform hardware simulation), or a combination thereof. In one illustrative example, the method 300 may be performed by the subscription management server component 111. Method 300 and/or each of its individual functions, routines, subroutines, or operations may be performed by one or more physical processors of the computer system executing the method.

At block 310, the subscription management server may receive a content certificate request from a managed computer system. The content certificate request may comprise an identity certificate and a digital content identifier. The identity certificate may identify a managed computer system consuming the digital content under a managed subscription. In an illustrative example, a managed computer system may be provided by a computer system comprising one or more virtual machines executed by one or more physical servers. In an illustrative example, the expected lifetime of one or more of the virtual machines of the managed computer system may be less than the entitlement period of time with respect to the digital content identified by the content certificate request.

At block 320, the subscription management server may validate the identity certificate. In an illustrative example, the validation may comprise ascertaining that the certificate has been signed by a digital signature of a certificate authority known to the subscription management server. The validation may further comprise ascertaining that the certificate identifier has not been included in a current certificate revocation list. Responsive to successfully validating the identity certificate, the processing may continue at block 330; otherwise, the subscription management server may, at block 340, transmit a response comprising a status code (e.g., HTTP 403) indicating that the identity certificate is invalid, and hence a content certificate could not be issued.

Responsive to ascertaining, at block 330, that the requestor has been registered with the subscription management system, the processing may continue at block 350; otherwise, the subscription management server may, at block 360, transmit a response comprising a status code (e.g., HTTP 404) indicating that the identity certificate is valid, but the requestor is unknown, and hence a content certificate could not be issued.

Responsive to ascertaining, at block 350, that the requested content has been licensed to the requestor under a valid subscription, the processing may continue at block 370; otherwise, the subscription management server may, at block 380, transmit a response comprising a status code (e.g., HTTP 402) indicating that the requestor is unauthorized to consume the requested content, and hence a content certificate could not be issued.

Responsive to ascertaining, at block 370, that a pre-defined authorization period of time does not exceed the entitlement period of time, the subscription management server may, at block 390, issue a short-lived content certificate authorizing the requestor to consume the digital content for the pre-defined authorization period. As noted herein above, in an illustrative example, the duration of the pre-defined authorization period may range from several minutes to several hours.

Responsive to failing to ascertain, at block 370, that a pre-defined authorization period of time does not exceed the entitlement period of time, the subscription management server may, at block 395, transmit a response comprising a status code (e.g., HTTP 402) indicating that the requestor is unauthorized to consume the requested content, and hence a content certificate could not be issued.

Upon issuing the content certificate, the subscription management server may, at block 397, transmit a response comprising the content certificate and a status code (e.g., HTTP 200) indicating that the content certificate request was successfully processed.

Figure 4:
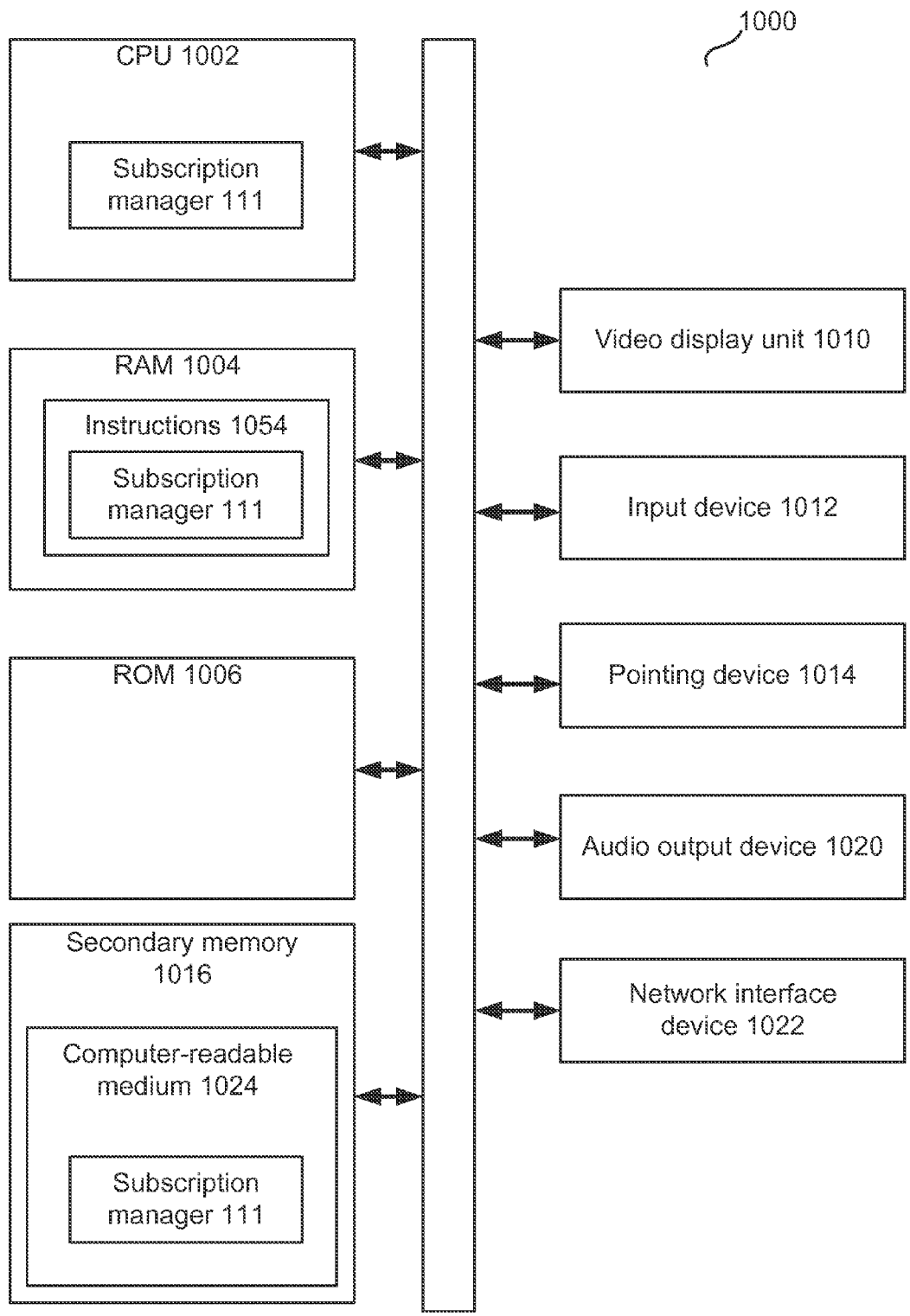
FIG. 4 depicts a block diagram of an illustrative computer system operating in accordance with examples of the present disclosure.

FIG. 4 depicts an example computer system 1000 within which a set of instructions, for causing the computer system to perform any one or more of the methods described herein, may be executed. In certain embodiments, the computer system 1000 may correspond to subscription management server 110 of FIG. 1.

In certain embodiments, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" may include any collection of computers that individually or jointly execute a set (or multiple sets) of instructions to perform any one or more of the methods described herein.

In a further aspect, computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions of subscription management server component 111. Instructions of subscription management server component 111 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative embodiment as a single medium, the term "computer-readable storage medium" may include a single medium or multiple media (e.g., a centralized or distributed database, and/or associated caches and servers) that store the one or more sets of executable instructions. The term "computer-readable storage medium" may also include any non-transitory medium that is capable of storing or encoding a set of instructions for execution by a computer that cause the computer to perform any one or more of the methods described herein. The term "computer-readable storage medium" may include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform functions, routines, subroutines, or operations of the methods described herein. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
   receiving, by a processor, a request comprising an identity certificate and a digital content identifier;
   validating an entitlement of a requestor identified by the identity certificate to consume, over an entitlement period of time, a digital content identified by the digital content identifier;
   determining that a pre-defined authorization period of time does not exceed the entitlement period of time, wherein the pre-defined authorization period of time does not exceed an expected lifetime of the requestor; and
   transmitting, to the requestor, a response comprising at least one of: a status code or a content certificate authorizing to consume the digital content for the pre-defined authorization period of time.

2. The method of claim 1, wherein the requestor is provided by a computer system comprising one or more virtual machines executed by one or more physical servers.

3. The method of claim 2, wherein an expected lifetime of one or more virtual machines is less than the entitlement period of time.

4. The method of claim 1, wherein the digital content comprises at least one of: an executable file, binary data, a document, a media content file, or a binary data stream.

5. The method of claim 1, wherein the identity certificate binds, by a digital signature, a public key to an identifier of the requestor.

6. The method of claim 1, wherein the entitlement authorizes the requestor to consume the digital content over one or more usage periods of time a sum of which does not exceed the entitlement period of time.

7. The method of claim 1, further comprising validating the identity certificate.

8. The method of claim 7, further comprising:
   responsive to failing to validate the identity certificate, transmitting a status code to the requestor, the status code indicating an invalid identity certificate.

9. The method of claim 1, further comprising: responsive to failing to validate the entitlement of the requestor to consume the digital content, transmitting a status code to the requestor, the status code indicating insufficient entitlement to consume the digital content.

10. The method of claim 1, wherein validating the entitlement of the requestor to consume the digital content comprises transmitting an entitlement validation request to an external computer system.

11. A system comprising:
    a memory; and
    a processor operatively coupled to the memory, to:
       receive a request comprising an identity certificate and a digital content identifier;
       validate an entitlement of a requestor identified by the identity certificate to consume, over an entitlement period of time, a digital content identified by the digital content identifier;
       responsive to determining that a pre-defined authorization period of time does not exceed the entitlement period of time, wherein the pre-defined authorization period of time does not exceed an expected lifetime of the requestor, transmit, to the requestor, a response comprising at least one of: a status code or a content certificate authorizing to consume the digital content for the pre-defined authorization period of time.

12. The system of claim 11, wherein the digital content comprises at least one of: an executable file, binary data, a document, a media content file, or a binary data stream.

13. The system of claim 11, wherein the identity certificate binds, by a digital signature, a public key to an identifier of the requestor.

14. The system of claim 11, wherein the entitlement authorizes the requestor to consume the digital content over one or more usage periods of time a sum of which does not exceed the entitlement period of time.

15. The system of claim 11, wherein the processor is further to validate the identity certificate.

16. The system of claim 15, wherein the processor is further, responsive to failing to validate the identity certificate, to transmit a status code to the requestor, the status code indicating an invalid identity certificate.

17. The system of claim 10, wherein the processor is further, responsive to failing to validate the entitlement of the requestor to consume the digital content, to transmit a status code to the requestor, the status code indicating insufficient entitlement to consume the digital content.

18. A computer-readable non-transitory storage medium comprising executable instructions that, when executed by a processor, cause processor to:
    receive, by the processor, a request comprising an identity certificate and a digital content identifier;
    validate an entitlement of a requestor identified by the identity certificate to consume, over an entitlement period of time, a digital content identified by the digital content identifier;
    responsive to determining that a pre-defined authorization period of time does not exceed the entitlement period of time, wherein the pre-defined authorization period of time does not exceed an expected lifetime of the requestor, transmit, to the requestor, a response comprising at least one of: a status code or a content certificate authorizing to consume the digital content for the pre-defined authorization period of time.

19. The computer-readable non-transitory storage medium of claim 18, further comprising executable instructions to cause the processor, responsive to failing to validate the identity certificate, to transmit a status code to the requestor, the status code indicating an invalid identity certificate.

20. The computer-readable non-transitory storage medium of claim 18, further comprising executable instructions to cause the processor, responsive to failing to validate the entitlement of the requestor to consume the digital content, to transmit a status code to the requestor, the status code indicating insufficient entitlement to consume the digital content.

* * * * *